Feb. 23, 1971 — A. W. COCHARDT — 3,564,705
METHOD FOR PROVIDING ORIENTED POLE PIECES IN A DYNAMOELECTRIC MACHINE
Filed Dec. 7, 1967

WITNESSES:
Helen M. Farkas
James F. Young

INVENTOR
Alexander W. Cochardt
BY H. M. Snyder
ATTORNEY

Feb. 23, 1971     A. W. COCHARDT     3,564,705
METHOD FOR PROVIDING ORIENTED POLE PIECES
IN A DYNAMOELECTRIC MACHINE
Filed Dec. 7, 1967     2 Sheets-Sheet 2

United States Patent Office 3,564,705
Patented Feb. 23, 1971

3,564,705
METHOD FOR PROVIDING ORIENTED POLE PIECES IN A DYNAMOELECTRIC MACHINE
Alexander W. Cochardt, Export, Pa., assignor to Westinghouse Electric Corporation, Pittsburgh, Pa., a corporation of Pennsylvania
Filed Dec. 7, 1967, Ser. No. 688,900
Int. Cl. H02k 15/00
U.S. Cl. 29—596         6 Claims

ABSTRACT OF THE DISCLOSURE

Oriented pole pieces are provided in a permanent magnet dynamoelectric machine by introducing at predetermined locations in the machine frame a hardenable nonmagnetic matrix material in a fluid condition loaded with ferromagnetic particles, establishing a magnetic field within the frame to orient the particles, and then fixing the particles in oriented alignment by hardening the fluid matrix material.

BACKGROUND OF THE INVENTION

The most common permanent magnet DC motors contain two radially magnetized arcuate ferrite stator segments that are positioned in surrounding relation to the armature. The pole arc of the segments is commonly approximately 140°. Such ferrite motors have generally been restricted to low torque, high speed applications in the field of fractional horsepower motors because of the low flux density emanating from the ferrite pole bases, usually only about 1000 to 2500 gauss and by the low energy available and the high cost of ferrite magnets in the form of large radial segments.

In U.S. Pat. No. 3,296,471 which issued Jan. 3, 1967, for "Dynamoelectric Machine," a permanent magnet motor is disclosed in which the permanent magnets are in the form of oriented flat ceramic ferrite slabs. Orienting permanent magnets in a preferred direction gives rise to greatly enhanced magnetic properties in the preferred direction. However, efforts to manufacture oriented arcuate ferrite magnet segments for use in the prior art dynamoelectric machines, resulted in severe cracking in a high proportion thereof during firing since once oriented, the magnets have anisotropic properties. As a result of this anisotropy, the shrinkage of the magnets varies with direction during sintering and, as a result, cracking occurs.

In the various embodiments disclosed in U.S. Pat. No. 3,296,471, the flat magnets do not conform to the generally cylindrical rotor configuration and therefor, pole shoes are provided for the purpose of concentrating the magnetic flux adjacent the rotor. The pole shoes are in contact with the magnets and closely approach the outer perimeter of the rotor. The pole shoes described in the patent may be composed of iron-powder core material, of densely sintered silicon-iron, of plastic-bound magnetic powder, of a metallic laminated structure, or even a solid magnetic steel.

SUMMARY OF THE INVENTION

The present invention is an improvement in the process of making an electrodynamic machine employing flat slab ferrite magnets in which highly efficient pole pieces are provided in an economical and rapid manner.

Specifically, the frame of the electrodynamic machine is assembled with the flat, slab-shaped ceramic magnets in place, but unmagnetized. The magnets may be strontium, barium or lead ferrites, but are preferably of the modified strontium ferrite type described in my U.S. Pat. Re. 26,153 which issued Jan. 31, 1967. The frame is open at both ends and it is therefore placed upon a firm base to close one of the open ends. A ferromagnetic male die member is inserted into the open end of the frame, spaced from said permanent magnets. The volume remaining after the insertion of the male die member is filled with a solidifiable nonmagnetic matrix material loaded with finely divided ferromagnetic particles which can move or be oriented or aligned in the matrix. This loaded nonmagnetic matrix material may be in liquid or powder form initially, but in any case it must be capable of being hardened or solidified while in the frame member. With the matrix material in the fluid or powder condition, a magnetic field is set up within the frame member which passes in turn from the frame member, through the magnet members, through the matrix material, and lastly into the ferromagnetic male die member. This magnetic field not only magnetizes the permanent magnet members in the preferred directions, but it also aligns the ferromagnetic particles in the matrix material in these same preferred directions. While the ferromagnetic particles in the matrix material are in this aligned condition, the matrix material is hardened so that the ferromagnetic particles are fixed and retained permanently in the alignment established by the magnetic field.

Dynamoelectric machines such as ferrite permanent magnet DC motors made by the process of the invention have a substantial number of advantages, such as:

(1) Slab ferrite magnets which are not perfectly formed, but rather, are cracked, warped, roughly surfaced, or either under or over size, may be used, since the fluid plastic matrix will flow around and about and conform to the magnet surfaces.

(2) Accurate stator inside dimensions are readily obtained at relatively low cost since the inside surface is formed against a die surface.

(3) Large flux densities can be obtained between rotor and stator at relatively low cost because high energy oriented magnets can be used, and because the flux is concentrated onto the rotor surface.

(4) The mechanical strength of the assembly is high, particularly if a high strength plastic such as epoxy resin is used for the plastic matrix.

(5) The magnets do not have to be in contact with the stator frame because the iron-plastic mixture can be made to flow into any space remaining between the stator frame and the magnets. Thus, a round tube can be employed as a stator frame with the space between the flat magnet and the tubular periphery filled with the iron-plastic mixture.

(6) The oriented iron-plastic mixture, because of its fiber structure, has an extremely high electrical resistivity perpendicular to the fiber direction. Thus, eddy current losses in the pole pieces are very low.

(7) The iron powder employed may be an impure, low cost grade, such as is obtained when concentrated magnetic ore powder is reduced with hydrogen to about 90 to 95% iron.

(8) Due to the relatively low saturation induction of the oriented iron-plastic pole pieces and due to the high intrinsic coercive forces of the ferrite magnets, the permanent magnet assembly can withstand extremely high armature demagnetizing forces, unlike the prior art ferrite magnet motors in which the magnets are demagnetized quite easily. This means that the motor can operate without harm at very low temperatures, that high stall-currents can be used, and that the armature diameter and resulting ampere turns can be higher.

It is an object of this invention to provide a dynamoelectric machine with magnetically oriented pole pieces.

It is a further object of this invention to provide a process wherein flat slab permanent magnets in a dynamoelectric machine are magnetized in a preferred direction simultaneously with orientation of magnetic pole pieces.

DESCRIPTION OF THE PREFERRED EMBODIMENT

Figure 1:
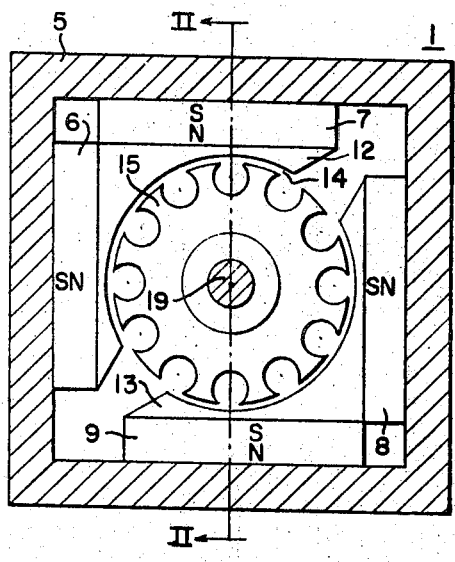
FIG. 1 is a cross-sectional view of a permanent magnet dynamoelectric machine of the type with which this invention is concerned.
Figure 2:
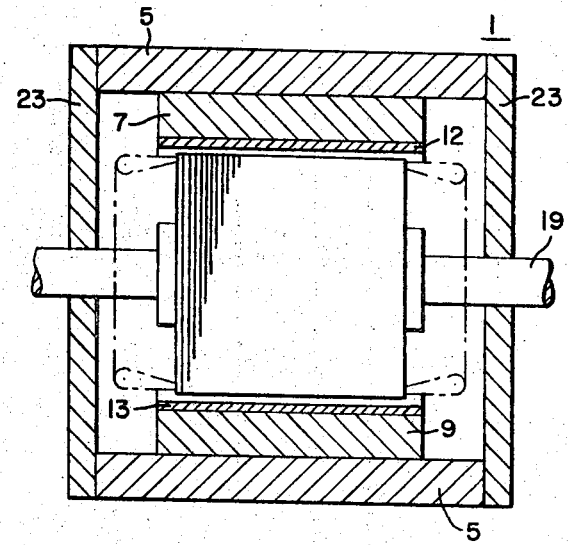
FIG. 2 is a view taken along line II—II of FIG. 1.

In FIG. 1 there is shown a ferrite permanent magnet dynamoelectric machine (in this case a motor) of the type with which this invention is concerned. The motor 1 includes a frame 5, rectangular in cross section, and on each internal wall thereof is positioned, respectively, flat slab ferrite permanent magnets 6, 7, 8 and 9. Magnets 6 and 7 constitute a pair wherein the magnet side adjacent and in contact with the frame member 5 has one polarity, whereas the side of the magnet closer to the central axis of the frame has the opposite polarity. The magnet slabs 8 and 9 constitute a second pair and are polarized in a manner opposite to that of the magnet pair 6 and 7. Associated with the magnet pair 6 and 7 is a pole piece 12, while associated with the magnet pair 8 and 9 there is a second pole piece 13. The pole pieces 12 and 13 have arcuate surfaces facing the central axis of the frame, thereby, at least in part, defining a cavity 14 wherein an armature may be mounted for rotation. In this case, the armature 15 is mounted for rotation on the shaft 19 which is rotatably mounted in end plates 23 (FIG. 2) of the motor frame 5.

Figure 3:
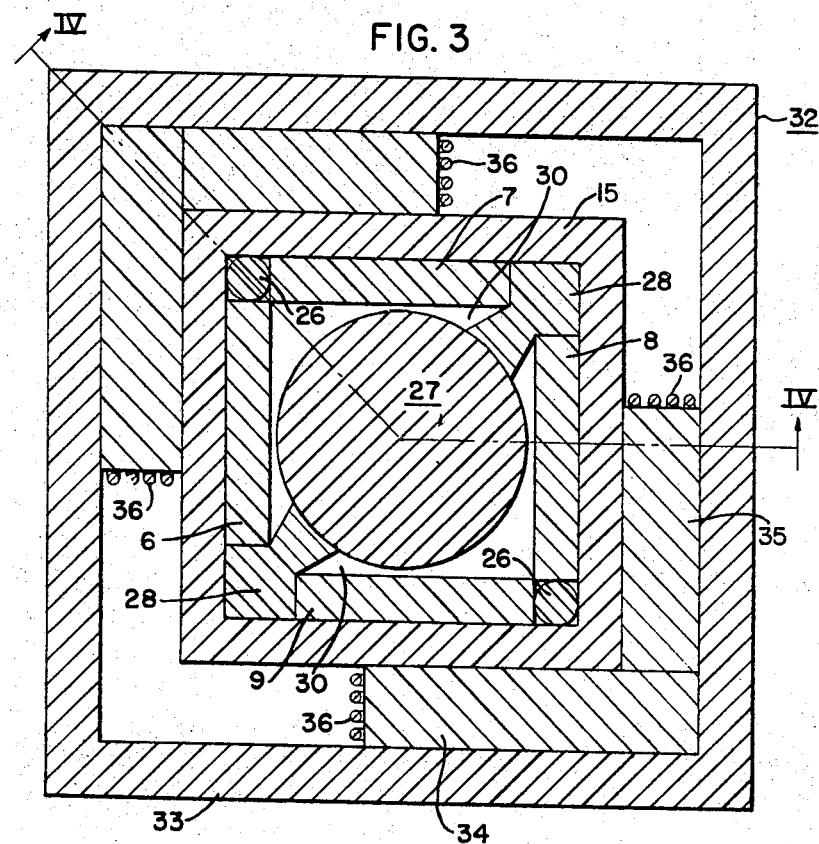
FIG. 3 shows the frame of a dynamoelectric machine positioned within a magnetizer in order to carry out the process of this invention.
Figure 4:
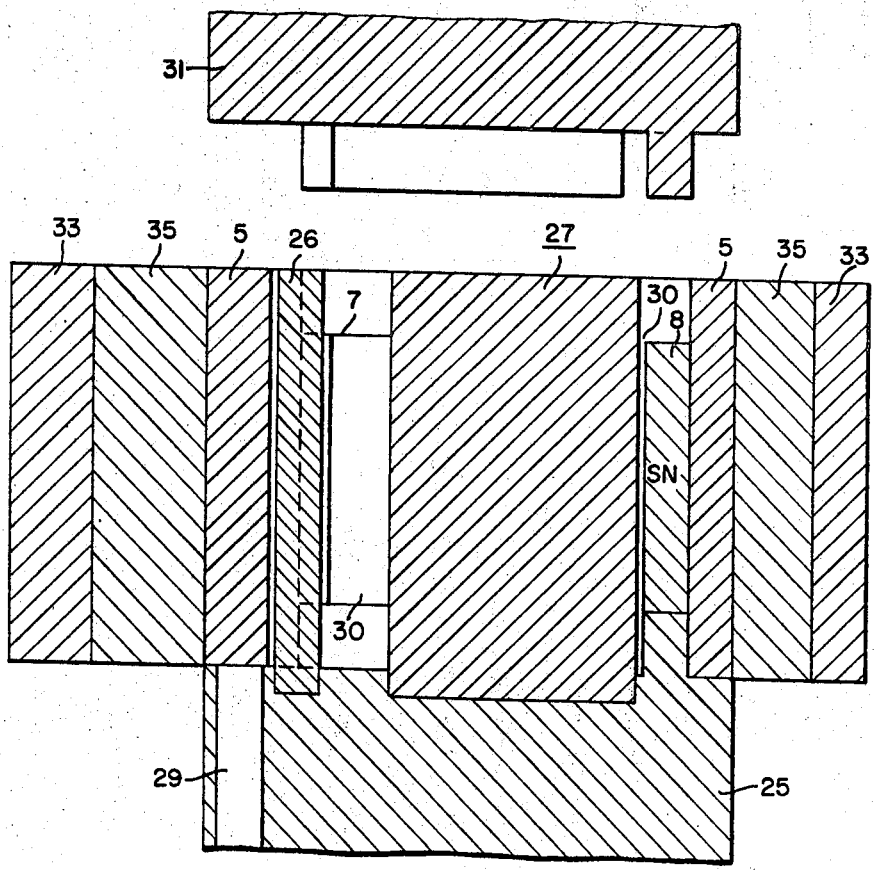
FIG. 4 shows a view in section taken along line IV—IV of FIG. 3.

Considering FIGS. 3 and 4, the process for making the oriented pole pieces 12 and 13 will be described. The stator frame 5, containing the as-yet unmagnetized magnet members, is mounted on the nonmagnetic bottom plunger 25. The two non-magnetic pins 26 secured to the plunger 25 have the function of positioning the stator frame 5 on the plunger. A cylinder 27 made from magnetically conducting material, such as steel, is fastened to the bottom plunger 25 and is thus located substantially centrally of the frame member 5. Two nonmagnetic fins 28 may be secured to or are integral with the cylinder 27, and ejection rod 29 is mounted within the bottom plunger 25 so that the entire frame assembly can be ejected after the operations to be described have been completed. A top plunger 31 is provided to close and confine the frame member 5.

It will be appreciated that with the frame member mounted on the bottom plunger 25 and the cylinder 27 positioned within the frame member, the frame member may be said to constitute a female die member, and the cylinder 27 correspondingly constitute a male die member. The empty volume 30 adjacent the four magnets 6, 7, 8 and 9 is then filled with a mixture of iron powder and a plastic matrix material. The filling of the die with the plastic matrix and iron powder may be accomplished before or after the top plunger 31 is brought down to close the die.

Surrounding the frame member is a magnetizer 32. The magnetizer includes a steel frame 33 having mounted therein iron plates 34 and 35 which are wound with a coil 36. With, for example, a hot thermoplastic matrix in the fluid condition injected into the frame member, the magnetizer is energized. The magnetic field thus established passes from the frame member, substantially radially of the frame axis, through the permanent magnets 6, 7, 8 and 9, through the pole pieces 12 and 13 and into the cylinder 27. Thus, the permanent magnets are magnetized by the magnetic field, and at the same time, the iron particles in the plastic matrix forming the pole pieces shift and rotate in the fluid matrix and become oriented in preferred magnetic directions. The plastic matrix is permitted to cool in the die member, while the magnetic field is maintained, to fix the ferromagnetic particles in their preferred orientation in the resinous matrix. Thereafter, the top plunger 31 is withdrawn and the ejector rod 29 is actuated to eject the frame member from the surrounding magnetizer.

Figure 5:
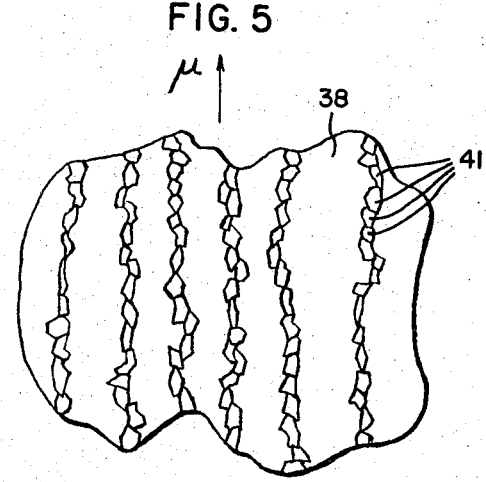
FIG. 5 shows a schematic microstructure of the magnetically oriented pole pieces.

The pole pieces thus formed have greatly enhanced magnetic properties in the direction in which the permanent magnet flux flows through the material deposited in the rotor cavity. A schematic representation of the microstructure of the magnetically oriented pole pieces is set forth in FIG. 5. The iron particles 41 are aligned to form so-called magnetic fibers embedded in the plastic matrix 38. Each particle 41 is in magnetic or even physical contact with adjacent particles. Very desirable and efficient magnetic properties are obtained by the structure illustrated in FIG. 4. In particular, the magnetic permeability is relatively high in the preferred direction and is low in the cross-direction.

There are various methods by which the iron-plastic mixture may be rendered fluid in the magnetic field and thereafter hardened to fix the ferromagnetic particles with the desired preferred orientation. Thus, one suitable method, as described above, is to inject a hot thermoplastic mixture into the assembly under pressure. In this method the iron-plastic mixture hardens as it cools in the magnetic field. Another method is to fill the frame member with cold powder of a thermoplastic resin-iron particle mixture, heat the mixture until the thermoplastic resin reaches a fluid condition under pressure while maintaining the orienting magnetic field so that the iron particles can rotate or move in the fluid resin matrix, and thereafter cooling the iron-plastic mixture until the resin solidifies and retains the iron particles in aligned position. Still another method is to employ a castable liquid resinous plastic, such as an epoxy resin. The epoxy resin with an appropriate curing agent such as an amine, is mixed with iron powder and then injected into the die volume of the assembly. When the iron particles have achieved the desired preferred orientation in the magnetic field, the mixture is cured either at room temperature or at an elevated temperature. Another method of accomplishing the same result is to employ an iron-plastic mixture in which a heat convertible resinous liquid or loose powder is thermosetting, such as a phenolic resin. The thermosetting plastic mixed with iron powder is cured under heat and pressure, whereby the phenolic resin fuses if a powder, the iron particles then orient themselves in the magnetic field and finally the resin sets to a solid.

The iron powder employed in this process may be composed of needle shaped particles, platelets or flakes, spheres or irregular particles. Needle-shaped iron particles are preferably, on the average, about 0.06 inch long by 0.01 inch in diameter. Platelets or flakes are preferably of the order of 0.01 inch in thickness with their largest cross-sectional area being roughly 0.06 inch x 0.06 inch. If spherical particles are used their average diameter may be approximately 0.06 inch. Particles of irregular shape should have a mesh-size such that 95% by weight passes through a 20 mesh sieve while 80% by weight is retained on a 60 mesh sieve.

There has thus been described a highly novel and useful structure for dynamoelectric machines and a practical and efficient process for making such machines.

It will be understood by those skilled in the art that although the invention has been described in connection with particular reference to specific embodiments, modifications and variations of the invention may be employed without departing from the underlying spirit and scope of the invention.

I claim as my invention:

1. In a process for making a permanent magnet dynamoelectric machine having a machine frame with a stator positioned therein, said stator including permanent magnet members positioned within said frame member and integral oriented pole pieces for the permanent magnet members, said pole pieces being formed within the frame and a rotor, the steps comprising:
   (a) defining within the machine frame at least one die cavity adjacent the magnet members,
   (b) filling the die cavity with a hardenable nonmagnetic matrix material loaded with orientable ferromagnetic particles,
   (c) establishing a magnetic field within said frame member in which the lines of force of said field pass sequentially through said magnet members and the material in said filled die cavity, whereby the ferromagnetic particles in said matrix material are aligned by the magnetic field,
   (d) fixing within the machine frame the aligned ferromagnetic particles in position within the matrix by hardening the matrix material, the hardened matrix with the aligned ferromagnetic particles therein constituting at least one highly efficient pole piece, and
   (e) mounting the motor adjacent siad at least one pole piece within said frame member.

2. In the process of claim 1 wherein the matrix material is thermoplastic, heating the matrix material to the fluid condition in step (c) to permit alignment of the ferromagnetic particles in the magnetic field, and thereafter permitting the matrix to cool in step (d) while the magnetic field is maintained to fix the ferromagnetic particles in alignment.

3. In the process of claim 1, wherein the matrix material is a thermosetting resinous material subjecting the matrix material in step (c) to the magnetic field for alignment of the ferromagnetic particles within the matrix, and thereafter, in step (d), heating the matrix material to thermoset it and thereby fix the ferromagnetic particles in alignment.

4. In the process of claim 1 wherein the matrix material is a liquid epoxy resin and includes a curing agent, subjecting the fluid plastic-iron mixture in step (c) to the magnetic field for alignment of the ferromagnetic particles, and then, in step (d), curing the epoxy to harden it and thereby fix the ferromagnetic particles in alignment.

5. The process of claim 1 wherein, in step (c) thereof, the permanent magnet members are magnetized and the ferromagnetic particles are aligned simultaneously by the magnetic field.

6. In a process for making a permanent magnet dynamoelectric machine with pole pieces integral with the magnets, the steps comprising:
   (a) positioning within a ferromagnetic frame member having open ends a plurality of unmagnetized permanent magnet members,
   (b) placing the frame member on a firm base to close one end of said member,
   (c) inserting a ferromagnetic male die member into the open end of said frame member so that the male die member is spaced from said unmagnetized permanent magnet members thereby forming a die cavity,
   (d) filling the die cavity with a nonmagnetic matrix material loaded with ferromagnetic particles,
   (e) establishing a magnetic field within said frame member in which the magnetic lines of force pass from said frame member sequentially through said permanent magnet members, said filled die cavity and said magnetic die member, whereby the ferromagnetic particles in said matrix material are aligned by the magnetic field,
   (f) fixing the aligned ferromagnetic particles in position within the matrix,
   (g) withdrawing the male die member from said frame member, and
   (h) mounting a wound rotor in the volume vacated by the male die member.

References Cited

UNITED STATES PATENTS

| | | | |
|---|---|---|---|
| 2,903,329 | 9/1959 | Weber | 29—608UX |
| 1,336,196 | 4/1920 | Chailliey | 310—154 |
| 2,048,161 | 7/1936 | Klaiber | 310—154 |
| 3,090,107 | 5/1963 | Minden et al. | 29—608 |
| 3,250,831 | 5/1966 | Hooper | 264—24 |
| 3,296,471 | 1/1967 | Cochardt | 310—154 |
| 3,387,066 | 6/1968 | Martin et al. | 264—108X |

JOHN F. CAMPBELL, Primary Examiner

C. E. HALL, Assistant Examiner

U.S. Cl. X.R.

29—608; 264—24, 108; 310—42, 154, 218